United States Patent

Mügge et al.

[11] Patent Number: 5,404,915
[45] Date of Patent: Apr. 11, 1995

[54] MULTILAYER PLASTIC PIPE

[75] Inventors: Joachim Mügge, Haltern; Stefan Röber, Marl; Hans-Dieter Herrmann, Marl; Hans Ries, Marl, all of Germany

[73] Assignee: Huels Aktiengesellschaft, Marl, Germany

[21] Appl. No.: 974,287

[22] Filed: Nov. 10, 1992

[30] Foreign Application Priority Data

Nov. 14, 1991 [DE] Germany ............. 41 37 431.2

[51] Int. Cl.⁶ ............................................. F16L 11/00
[52] U.S. Cl. ................................. 138/137; 138/141; 138/146; 138/DIG. 7
[58] Field of Search ............... 138/141, 145, 146, 137, 138/DIG. 1, DIG. 7; 428/36, 35.7, 423.5, 474.7, 475.2

[56] References Cited

U.S. PATENT DOCUMENTS

| | | |
|---|---|---|
| 3,378,602 | 4/1963 | Robertson . |
| 3,561,493 | 2/1971 | Maillard et al. . |
| 3,584,656 | 6/1971 | Van Assendelet et al. ......... 138/141 |
| 3,762,986 | 10/1973 | Bhuta et al. ........................ 138/141 |
| 3,829,324 | 8/1974 | Blais et al. ........................ 138/145 |
| 3,963,844 | 6/1976 | Shimotsuma et al. ............... 428/36 |
| 4,007,070 | 2/1977 | Busdiecker ....................... 138/141 |
| 4,443,519 | 4/1984 | Donermeyer et al. . |
| 4,482,588 | 11/1984 | Fagerburg et al. ................ 138/141 |
| 4,528,219 | 7/1985 | Yamada et al. . |
| 4,633,912 | 1/1987 | Pilkington et al. ................ 138/137 |
| 4,656,242 | 4/1987 | Swan et al. . |
| 4,725,488 | 2/1988 | Swan et al. . |
| 4,855,181 | 8/1989 | Shimo et al. . |
| 5,016,675 | 5/1991 | Igarashi et al. ................... 138/137 |
| 5,108,844 | 4/1992 | Blemberg et al. . |

FOREIGN PATENT DOCUMENTS

| | | |
|---|---|---|
| 0325030 | 7/1989 | European Pat. Off. . |
| 0509212 | 10/1992 | European Pat. Off. . |
| WO87/02680 | 5/1987 | WIPO . |

Primary Examiner—Timothy F. Simone
Assistant Examiner—James F. Hook
Attorney, Agent, or Firm—Oblon, Spivak, McClelland, Maier & Neustadt

[57] ABSTRACT

A multilayer plastic pipe having improved barrier action against diffusion of the substance being transported, particularly methanol-containing fuels, dimensional stability, resistance to mechanical stress, and particularly improved adhesion between layers is provided comprising:
(A) an inner layer and an outer layer, each of which comprise a polyamide-based molding composition, wherein the inner layer and outer layer may be the same or different, and (B) at least one intermediate layer comprising
  a) 95 to 60% by weight of a linear, crystalline polyester and
  b) 5 to 40% by weight of a polymer containing reactive groups other than epoxide groups, wherein the reactive groups are contained in a concentration of from 4 to 95 mmol/kg based on the total amount of component (B); and wherein the layers are intimately bonded to one another.

25 Claims, No Drawings

MULTILAYER PLASTIC PIPE

BACKGROUND OF THE INVENTION

1. Field of the Invention

The present invention relates to a multilayer plastic pipe having improved barrier action against diffusion of the material being transported by the pipe, while maintaining dimensional stability and mechanical strength.

2. Discussion of the Background

Plastic pipes prepared from polyamide resin are known and are used for various applications. In order to perform the particular application desired, the pipes must be inert to the material flowing in them. Additionally, they must be resistant to both high and low temperatures-and mechanical stresses.

Single-layer pipes are not always capable of meeting these necessary requirements. For example, during transportation of aliphatic or aromatic solvents or fuels, they exhibit several problems, such as a lack of barrier action against the medium, dimensional instability and insufficient resistance to mechanical stresses.

Attempts have been made to solve these problems by the use of multilayer pipes (DE-A 35 10 395; 37 15 251; 38 21 723; 38 27 092; 40 01 125; and 40 01 126). However, in practice, while these multilayer pipes can solve these problems individually, the overall set of properties displayed by the pipes is still unsatisfactory.

German Patent 38 27 092 describes a multilayer pipe which has, from the inside outward, layers of polyamide, polyvinyl alcohol, polyamide and polyester. The polyester is used only as a thin outer layer, in order to achieve a higher resistance to short-term heat deformation. However, it is well known in the field of polymer composites that the majority of polymers, such as polyamides and polyesters, are incompatible with one another. Thus, the typical result of most multilayer composites is that the laminate layers show no adhesion to one another. An intimate bond between the individual polymer layers is absolutely essential for industrial uses, in order to avoid delamination.

Multilayer composites of particular polyamide mixtures and various other thermoplastics, such as, for example, polyethylene terephthalate, are known from EP-A-287 839. Conventionally, in order to achieve necessary adhesion, an adhesion promoter is introduced between the laminate layers. Examples of such adhesion promoters include functionalized polyolefins, functionalized ethylene/vinyl acetate copolymers, ethylene/acrylate copolymers, ionomers, polyalkylene oxide/-polyester block copolymers, derivatives of carboxymethyl cellulose and blends of these polymers with polyolefins.

It has now been found that these adhesion promoters do not give a long-term intimate bond, especially in a polyamide/polyester system. Because the adhesion promoters are not sufficiently resistant to thermal deformation and solvents, the adhesion which is achieved is usually lost under conditions of heating or under the action of solvents. Additionally, these composites fail when exposed to shear forces due to cold flow of the adhesion promoter.

SUMMARY OF THE INVENTION

Accordingly, one object of the present invention is to provide a multilayer plastic pipe which has good barrier action against the material being transported, satisfactory dimensional stability and satisfactory resistance to mechanical stresses.

A further object of the present invention is to provide a multilayer pipe having a solvent- and heat-resistant bond, between a polyester-based layer and a polyamide-based layer, which is insensitive to shear stresses and has good mechanical properties.

A still further object of the present invention is to provide a bond, between a polyester-based layer and a polyamide-based layer of a multilayer plastic pipe, which exhibits strong cohesion at the phase boundaries.

These and other objects and attendant advantages have been satisfied by the discovery of a multilayer plastic pipe having an inner layer and an outer layer, both of which comprise a polyamide-based molding composition, where the inner and outer layers are intimately bonded together by at least one intermediate layer comprising a molding composition based on a mixture of from 96 to 60% by weight of a linear, crystalline polyester and 5 to 40% by weight of a polymer containing reactive groups, other than epoxy groups, wherein the reactive groups are contained in the intermediate layer at a concentration of from 4 to 95 mmol/kg, wherein the pipe has excellent barrier properties, dimensional stability, and resistance to mechanical stress.

DETAILED DESCRIPTION OF THE PREFERRED EMBODIMENTS

The present invention relates to a multilayer plastic pipe comprising (A) an inner layer and an outer layer, both of which comprise a polyamide-based molding composition, where the inner and outer layers are intimately bonded together by (B) at least one intermediate layer comprising a molding composition based on a mixture of (a) from 96 to 60% by weight of a linear, crystalline polyester and (b) 5 to 40% by weight of a polymer containing reactive groups, other than epoxy groups, wherein the reactive groups are contained in the intermediate layer at a concentration of from 4 to 95 mmol/kg.

The inner and outer layers of component (A) may be made from the same or different polyamides. Each layer may comprise a single polyamide or a mixture of suitable polyamides. Suitable polyamides for use as the layers in component A include aliphatic homo- and copolycondensates. Examples of homopolyamides include 4,6-; 6,6-; 6,12-; 8,10- and 10,10 polyamides. In particular, 6-; 10,12-; 11-; 12- and 12,12-polyamides are preferred. The identification of the polyamides corresponds to the international standard, the first figure(s) indicating the number of C atoms of the starting diamine and the last figure(s) indicating the number of C atoms of the dicarboxylic acid. If only one number is given, this means that an $\alpha,\omega$-amino-carboxylic acid or the lactam derived therefrom has been used as the starting substance (see H. Domininghaus, "Die Kunststoffe und ihre Eigenschaften" Plastics and their Properties, page 272, VDI-Verlag (1976).

If copolyamides are used, these comprise one or more additional acid components, such as adipic acid, sebacic acid, suberic acid, isophthalic acid or terephthalic acid, and one or more additional diamines, such as bis (4'-aminocyclohexyl) -methane, trimethylhexamethylenediamine, or hexamethylenediamine.

The preparation of these polyamides is known (for example D. B. Jacobs, J. Zimmermann, Polymerization Processes, page 424–67; Interscience Publishers, New York (1977) and DE-AS 21 52 194).

Mixed aliphatic/aromatic polycondensates such as are described, for example, in U.S. Pat. Nos. 2,071,250; 2,071,251; 2,130,523; 2,130,948; 2,241,322; 2,312,966; and 3,393,210 and in Kirk-Othmer, Encyclopedia of Chemical Technology, 3rd Edition, Volume 18, page 328 and 435 - Wiley & Sons (1982) are also suitable as the polyamides. Additionally, poly(ether-ester-amides) and poly(ether-amides) are polycondensates which are suitable as the polyamides. Such products are described, for example, in DE-OS 27 12 987, 25 23 991 and 30 06 961.

The molecular weight (number-average) of the polyamides is above 5,000, preferably from 10,000 to 100,000, corresponding to a relative viscosity ($\eta$rel) in the range from 1.5 to 2.8.

One essential feature of the polyamides of component (A) is that at least 50%, preferably 70%, of all the end groups present in the polyamide are amino end groups. Moreover, it is important that the concentration of amino end groups in component (A) is in the range of from 30 to 130 mmol/kg, preferably 60 to 110 mmol/kg.

The linear, crystalline polyester of component (B) has the following formula (I)

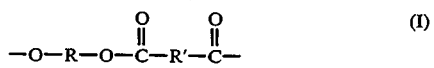

where R represents a divalent, branched or non-branched, aliphatic and/or cycloaliphatic, radical derived from a diol having 2 to 12, preferably 2 to 8, C atoms in the carbon chain and R' represents a divalent aromatic radical having 6 to 20, preferably 8 to 12, C atoms in the carbon skeleton.

Suitable diols include ethylene glycol, trimethylene glycol, tetramethylene glycol, hexamethylene glycol, neopentyl glycol, and cyclohexanedimethanol, with ethylene glycol and tetramethylene glycol being preferred.

Up to 25 mol % of the diol portion of the polyester can be replaced by a second diol selected from the same group of diols as the first, or by a diol having the following formula (II)

wherein R" denotes a divalent radical having 2 to 4 C atoms and x is an integer from 2 to 50.

Suitable aromatic carboxylic acids include terephthalic acid, isophthalic acid, 1,4-, 1,5-, 2,6- or 2,7-naphthalenedicarboxylic acid, diphenic acid and diphenyl ether-4,4'-dicarboxylic acid.

Up to 20 mol % of these aromatic dicarboxylic acids can be replaced by one or more aliphatic dicarboxylic acids, such as, succinic acid, maleic acid, fumaric acid, sebacic acid, and dodecanedioic acid.

Any conventional method may be used to prepare the linear, crystalline polyester of the present invention (see the following for preparative methods: DE-A 24 07 155 and 24 07 156; and Ullmanns Encyclopädie der technischen Chemie (Ullmann's Encyclopedia of Industrial Chemistry), 4th Edition, Volume 19, page 65 et seq. - Verlag Chemie GmbH, Weinheim, 1980).

The polyesters employed according to the invention have a viscosity number (J value) in the range from 80 to 240 cm$^3$/g, preferably 130 to 210 cm$^3$/g.

The polyamide of component (A) and/or the linear, crystalline polyester of component (Ba) or both can comprise up to 40% by weight of other thermoplastics as long as these additional thermoplastics do not interfere with the bonding capacity. Examples of such thermoplastics include polycarbonate [H. Schnell, Chemistry and Physics of Polycarbonates, Interscience Publishers, New York (1981)], acrylonitrile/styrene/butadiene copolymer (Houben-Weyl, Methoden der organischen Chemie (Methods of Organic Chemistry), Volume 14/1, Georg Thieme Verlag Stuttgart, pages 393–406; Ullmanns Encyclopädie der technischen Chemie (Ullmann's Encyclopedia of Industrial Chemistry), 4th Edition, Volume 19, Verlag Chemie Weinheim (1981), pages 279–284), acrylonitrile/styrene/acrylate copolymer (Ullmanns Encyclopädie der technischen Chemie (Ullmann's Encyclopedia of Industrial Chemistry), 4th Edition, Volume 19, Verlag Chemie Weinheim (1981), pages 277–295), acrylonitrile/styrene copolymer (Ullmanns Encyclopädie der technischen Chemie (Ullmann's Encyclopedia of Industrial Chemistry), 4th Edition, Volume 19, Verlag Chemie Weinheim (1981), page 273 et seq.) or polyphenylene ethers (DE-A 32 24 691 and 32 24 692 and U.S. Pat. Nos. 3,306,874, 3,306,875 and 4,028,341).

If necessary, the polyamides and/or polyesters can be impact modified. Polymers suitable as impact modifiers include ethylene/propylene or ethylene/propylene/diene copolymers (EP-A-295 076), polypentenylene, polyoctenylene, or random copolymers or copolymers having a block-like structure of alkenyl-aromatic compounds with aliphatic olefines or dienes (EP-A-261 748). Additionally, impact-modifying rubbers may be used, such as core/shell rubbers. These have a tough and resilient core of acrylate, methacrylate, butadiene or styrene/butadiene rubber with glass transition temperatures $T_g < -10°$ C., with the core optionally being crosslinked. The shell can be built up from styrene or methyl methacrylate or other unsaturated monomers or combinations thereof (DE-A 21 44 528 and 37 28 685). The content of impact-modifying component should be sufficiently low, preferably less than 50% by weight of the composition, so that the desired barrier properties are not impaired.

Polymers which contain reactive groups which are capable of reacting with the reactive groups of a polyester or of a polyamide are used as component (Bb). In the context of the present invention reactive groups include carboxyl, anhydride, ester, N-acyl-lactam and oxazoline groups. Carboxylic acid anhydride groups are particularly suitable. Preferably the polymer of component (Bb) is a rubber elastic polymer.

Examples of polymers which are suitable for component (Bb) include: styrene/maleic acid, styrene/(meth)acrylic acid, styrene/butyl acrylate/(meth)acrylic acid, ethylene/(meth)acrylic acid and ethylene/butyl acrylate/(meth)acrylic acid copolymers.

Additionally one may use graft copolymers having ethylene/propylene, ethylene/propylene/diene, styrene/butadiene block, styrene/butadiene, styrene block, styrene/ethylene/butylene block or styrene/acrylate copolymers, butadiene, acrylate or silicone rubbers, or polytransoctenylene as the graft base.

Monomers which are suitable as the shell of the graft copolymer contain one or more of the above identified reactive groups, examples of these include, (meth)acrylic acid, maleic acid (anhydride), vinyloxazoline and methacryloyllauro lactam.

The polymers containing reactive groups are known and can be prepared by conventional methods [EP-A 164 179, 173 380, 210 307 and 404 261; U.S. Pat. No. 3,953,655; F. R. Eirick, Science and Technology of Rubber, Academic Press, New York (1978), pages 43–48, 65–71, 455–487; M. Fedtke, Reaktionen an Polymeren (Reactions on Polymers), VEB Deutscher Verlag für Grundstoffindustrie, Leipzig, (1985); G. Allen, Comprehensive Polymer Science, Pergamon Press, Oxford, (1988), pages 2–42, 403–419; and P. Svec, Styrene-based Plastics and their Modification, Ellis Horwood, New York, (1989)].

Component (B) comprises 95 to 60%, preferably 95 to 70%, more preferably 90 to 80% by weight of component (Ba) and 5 to 40%, preferably 5 to 30%, more preferably 10 to 20% by weight of component (Bb). The reactive groups of component (Bb) must be present in component (B) in a concentration of from 4 to 95 mmol/kg, preferably from 6 to 75 mmol/kg.

Component (B) can be prepared by conventional methods such as mixing components (Ba) and (Bb) in the melt at temperatures of between 200° and 300° C., in a mixing unit having good kneading action, such as a twin-screw kneader.

Customary auxiliaries and additives, such as flameproofing agents, stabilizers, processing auxiliaries, viscosity modifiers, fillers, and pigments, can be added to component (A) or component (B) or both. The amount of auxiliaries and additives, in particular of processing auxiliaries, must be chosen so that the barrier properties are not detrimentally affected.

The multilayer plastic pipes are produced according to conventional methods, such as those described in the references noted above.

The multilayer plastic pipes according to the invention have an excellent chemical resistance to the substance being transported and provide excellent barrier action against diffusion with respect to the substance transported, in particular chemical agents, solvents and fuels. Additionally, the layers of the multilayer pipe are intimately bonded to one another such that during thermal expansion or bending of the pipe, no delamination of the various layers occurs. In addition to a three-layer pipe, pipes according to the present invention can comprise, for example, 5 or 7 layers by additionally incorporating further layers of component A or B.

Having generally described this invention, a further understanding can be obtained by reference to certain specific examples which are provided herein for purposes of illustration only and are not intended to be limiting unless otherwise specified.

The results shown in the examples were determined with the aid of the following measurement methods.

The determination of the solution viscosity (relative viscosity $\eta_{rel}$) of the polyamides is carried out using a solution of 0.5% by weight of the polyamide in m-cresol at 25° C. in accordance with DIN 53 727/ISO 307.

The determination of the solution viscosity (viscosity number J) of the polyesters is carried out using a solution of 0.5% by weight of the polyester in an o-dichlorobenzene/phenol mixture (50:50 parts by weight) at 25° C. in accordance with DIN 53 728/ISO 1628 - Part 5.

To determine the amino end groups, 1 g of component (A) is dissolved in 50 ml of m-cresol at 25° C. The solution is titrated potentiometrically with perchloric acid.

To determine the carboxyl end groups in component (A) or (B), 1 g of polycondensate is dissolved in 50 ml of benzyl alcohol at 165° C., while blanketing with nitrogen. The dissolving time is no more than 20 minutes. The solution is titrated with a solution of KOH in ethylene glycol (0.05 mol of KOH/l) against phenolphthalein until the color changes.

The determination of the reactive groups in component (Bb) is dependent upon the nature of the reactive group. In the case of maleic anhydride, the content is determined by IR spectroscopy (anhydride bands at 1790 cm$^{-1}$).

The determination of the diffusion of amounts of fuel is carried out on films, by introducing 50 ml of a fuel mixture (fuel M 15–42.5 parts by volume of isooctane, 42.5 parts by volume of toluene and 15 parts by volume of methanol) into a cylindrical vessel ($\phi$ 5 cm, height 3 cm), which is tightly sealed with the film to be tested. Diffusion is determined at 23°±1° C. as the weight loss by diffusion with respect to time (measurement every 24 hours). The weight loss recorded per unit area is evaluated as follows:

| good: | diffusion $< 175 \text{ g} \cdot \text{d}^{-1} \cdot \text{m}^{-2}$ |
|---|---|
| moderate: | diffusion $\geq 175 \text{ g} \cdot \text{d}^{-1} \cdot \text{m}^{-2}$ and $\leq 300 \text{ g} \cdot \text{d}^{-1} \cdot \text{m}^{-2}$ |
| poor: | diffusion $> 300 \text{ g} \cdot \text{d}^{-1} \cdot \text{m}^{-2}$ |

The determination of the strength of the intimate bond between the individual layers is carried out on multilayer pipes or films. In this determination, attempts are made to separate the layers from one another manually, by buckling the pipes or films, with a subsequent attempt at delamination using a cutting tool and crosshatch. Pipes and films are classified as "good" if no delamination of the layers takes place. Delamination within a layer leads to the same classification. Pipes and films in which delamination takes place between two layers are described as "poor".

Experiments A–E are comparative experiments and are not in accordance with the present invention.

EXAMPLES

| A. | Component (A) |
|---|---|
| PA 1: | Polyamide 12 ($\eta_{rel}$: 2.08; 30% of the end groups are amino groups; 16 mmol/kg of amino end groups; 36 mmol/kg of carboxyl end groups) |
| PA 2: | Polyamide 12 ($\eta_{rel}$: 2.10; 30% of the end groups are amino groups; 15 mmol/kg of amino end groups; 34 mmol/kg of carboxyl end groups; modified with 15 parts by weight of commercially available plasticizer per 100 parts by weight of polyamide 12) |
| PA 3: | Polyamide 12 ($\eta_{rel}$: 1.9; 86% of the end groups are amino groups; 60 mmol/kg of amino end groups; 10 mmol/kg of carboxyl end groups) |
| PA 4: | Polyamide 6,12 ($\eta_{rel}$: 1.9; 884 of the end groups are amino groups; 93 mmol/kg of amino end groups; 13 mmol/kg of carboxyl end groups) |
| PA 5: | Polyamide 6,6 ($\eta_{rel}$: 78.4% of the end groups are amino groups; 105 mmol/kg of amino end groups; 29 mmol/kg of carboxyl end groups) |
| PA 6: | Polyamide 6 ($\eta_{rel}$: 2.01; 51.6% of the end groups are amino groups; 33 mmol/kg of amino end groups; 31 mmol/kg of carboxyl end groups) |
| B. | Component (B) |
| Z 1: | Ethylene/vinyl alcohol copolymer - EVAL$^R$ EP-E 105 A |

-continued

| | |
|---|---|
| Z 2: | Polyethylene - VESTOLEN ® A 4042 |
| Z 3: | Blend of |
| | a. 80% by weight of homo-polybutylene terephthalate (J value: 110 cm³/g) and |
| | b. 20% by weight of maleic acid-modified EPM (content of maleic anhydride: 0.7% by weight based on component b; anhydride group content: 14 mmol/kg - based on component B) |
| Z 4: | Blend of |
| | a. 90% by weight of homo-polybutylene terephthalate (J value: 110 cm³/g) and |
| | b. 10% by weight of maleic acid-modified EPM (content of maleic anhydride: 0.7% by weight based on component b; anhydride group content: 7 mmol/kg - based on component B) |

C. Production of films and pipes

The films were produced on a laboratory three-layer film line with a 400 mm three-layer film die and a subsequent triple-roll calender stack. The extruder temperature during production of the films was set at 185° C. (PA 2); 200° C. (PA 1 and PA 3); 220° C. (Z 2); 225° C. (Z 1) and 240° C. (PA 4; Z 1 and Z 3).

Pipes having dimensions of 8 mm (external diameter)×1 mm (total wall thickness) and a three-layer build-up were produced on a laboratory pipe extrusion line with a five-layer pipe die (2 channels closed) (outer layer: about 0.75 mm, intermediate layer: about 0.15 mm, inner layer: about 0.1 mm). The feed extruders all had a screw diameter of 25 mm. The barrel temperatures were 230° C. (PA 1 and PA 3; Z 1), 240° C. (PA 4), 260° C. (Z 3 to Z 5) and 290° C. (PA 5).

Obviously, numerous modifications and variations of the present invention are possible in light of the above teachings. It is therefore to be understood that within the scope of the appended claims, the invention may be practiced otherwise than as specifically described herein.

| Experi-ment | | Inner layer | Intermediate layer | Outer layer | Strength of intimate bond | Diffusion [g · d⁻¹ · m⁻²] |
|---|---|---|---|---|---|---|
| 1 | F*) | PA 3 | Z 3 | PA 3 | good | good |
| 2 | F | PA 4 | Z 3 | PA 4 | good | good |
| 3 | F | PA 3 | Z 4 | PA 3 | good | good |
| 4 | P*) | PA 3 | Z 3 | PA 3 | good | good |
| 5 | P | PA 4 | Z 4 | PA 4 | good | good |
| A | F | PA 1 | Z 1 | PA 1 | poor | moderate |
| B | F | PA 2 | Z 2 | PA 3 | poor | good |
| C | F | PA 1**) | — | — | — | poor |
| D | F | PA 2**) | — | — | — | poor |
| E | P | PA 1 | Z 1 | PA 1 | poor | — |

*)F = multilayer film (total layer thickness: about 0.1 mm)
P = multilayer pipe
**)Single-layer film (layer thickness: about 0.1 mm)

What is claimed as new and desired to be secured by letters patent of the United States is:

1. A multilayer plastic pipe, comprising:
  A) an inner polyamide layer and an outer polyamide layer, said polyamide having end groups, wherein at least 50% of all said end groups present in said polyamide inner and outer layers are amino end groups; and
  B) an intermediate layer in contact with said inner and outer layers, said intermediate layer containing a mixture of:
    a) 95 to 60% by weight of a linear, crystalline polyester and
    b) 5 to 40% by weight of a polymer containing reactive groups other than epoxide groups, wherein said reactive groups are contained in a concentration of from 4 to 95 mmol/kg based on the total amount of said intermediate layer and said reactive groups react with said amino end groups to bond said inner and outer layers to said intermediate layer.

2. A multilayer plastic pipe according to claim 1, wherein at least 70% of all the end groups present in the polyamide are amino end groups.

3. A multilayer plastic pipe according to claim 1, wherein the concentration of amino end groups in component A is in the range of from 60 to 110 mmol/kg.

4. A multilayer plastic pipe according to claim 1, wherein said intermediate layer contains a mixture of:
  a) 95 to 70% by weight of a linear, crystalline polyester and
  b) 5 to 30% by weight of a polymer containing reactive groups.

5. A multilayer plastic pipe according to claim 1, wherein said intermediate layer contains a mixture of:
  a) 90 to 80% by weight of a linear, crystalline polyester and
  b) 10 to 20% by weight of a polymer containing reactive groups.

6. A multilayer plastic pipe according to claim 1, wherein said reactive groups are one or more reactive groups selected from the group consisting of carboxyl, anhydride, ester, N-acyl-lactam and oxazoline groups.

7. A multilayer plastic pipe according to claim 1, wherein said reactive groups are present in a concentration of from 6 to 75 mmol/kg based on the total amount of said intermediate layer.

8. A multilayer plastic pipe according to claim 1, wherein said polymer containing reactive groups is a rubber-elastic polymer.

9. A multilayer plastic pipe according to claim 1, wherein said polyamide is selected from the group consisting of 4,6-; 6-; 6,6-; 6,12-' 8,10-' 10,10-; 12,12-; 12,12-; 11-; and 12-homopolyamide; copolyamides of these homopolyamides with one or more additional acid components selected from the group consisting of adipic acid, sebacic acid, suberic acid, isophthalic acid, and terephthalic acid; copolyamides of these homopolyamides with one or more additional diamines selected from the group consisting of bis(4'-aminocyclohexyl)-methane, trimethyl hexamethylene diamine, and hexamethylene diamine; and mixtures thereof.

10. A multilayer plastic pipe according to claim 1, wherein said linear crystalline polyester comprises a polymer of formula (I)

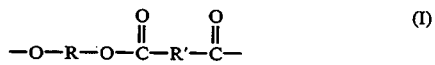

wherein R represents a divalent branched or nonbranched, aliphatic or cycloaliphatic radical, derived from a diol having 2 to 12 carbon atoms in the chain, or a mixture thereof, and R' represents a divalent aromatic radical having 6 to 20 carbon atoms in the carbon skeleton.

11. A multilayer plastic pipe according to claim 10, wherein up to 25 mol % of said radical R of said polyester is replaced by a second radical selected from the group consisting of a different radical as defined by R, or a radical derived by a diol of formula (II)

$$HO(\!-\!R''\!-\!O)_x\!H, \quad (II)$$

wherein R" represents a divalent radical having from 2 to 4 carbon atoms and x is an integer of from 2 to 50.

12. A multilayer plastic pipe according to claim 10, wherein up to 20 mol % of said aromatic divalent radical R' is replaced by one or more aliphatic divalent radicals derived from a carboxylic acid selected from the group consisting of succinic acid, maleic acid, fumaric acid, sebacic acid and dodecanedioic acid.

13. A multilayer plastic pipe according to claim 1, wherein said linear crystalline polyester has a viscosity number of from 80 to 240 cm³/g.

14. A multilayer plastic pipe according to claim 1, wherein said polyamide based molding composition further comprises an effective amount of one or more substances selected from the group consisting of impact modifiers, processing auxiliaries, flameproofing agents, stabilizers, viscosity modifiers, fillers, and pigments.

15. A multilayer plastic pipe according to claim 1, wherein said intermediate layer further comprises an effective amount of one or more substances selected from the group consisting of impact modifiers, processing auxiliaries, flameproofing agents, stabilizers, viscosity modifiers, fillers and pigments.

16. A multilayer plastic pipe according to claim 1, further comprising a third polyamide layer wherein at least 50% of all end groups present in said third polyamide layer are amino end groups; and a second said intermediate layer in contact with said outer polyamide layer and said third polyamide layer, wherein said reactive groups react with said amino end groups to bond said outer layer and said third layer to said second intermediate layer.

17. A multilayer plastic pipe according to claim 16, further comprising a fourth polyamide layer wherein at least 50% of all end groups present in said fourth polyamide layer are amino end groups, and a third said intermediate layer in contact with said third polyamide layer and said fourth polyamide layer, wherein said reactive groups react with said amino end groups to bond said third polyamide layer and said fourth polyamide layer to said third intermediate layer.

18. A multilayer plastic pipe according to claim 6, wherein said reactive group is a carboxylic acid anhydride group.

19. A multilayer plastic pipe according to claim 6, wherein said reactive group is a carboxylic acid group.

20. A multilayer plastic pipe according to claim 6, wherein said reactive group is a carboxylic acid ester group.

21. A multilayer plastic pipe according to claim 6, wherein said reactive group is a N-acyl-lactam group.

22. A multilayer plastic pipe according to claim 6, wherein said reactive group is an oxazoline group.

23. A multilayer plastic pipe according to claim 1, wherein said polymer containing reactive groups is a polymer selected from the group consisting of styrene/-maleic acid, styrene/(meth) acrylic acid, styrene/butyl acrylate/(meth) acrylic acid, ethylene/(meth) acrylic acid, ethylene/butyl acrylate/(meth)acrylic acid, ethylene/propylene, ethylene/propylene/diene, styrene/butadiene block, styrene/butadiene, styrene block, styrene/ethylene/butylene block and styrene/acrylate copolymers, butadiene, acrylate and silicone rubbers, and polytransoctenylene.

24. A method for minimizing diffusion of a chemical agent during passage through a multilayer pipe, comprising:
  interposing between a polyamide based inner layer and a polyamide based outer layer of said pipe, an intermediate pipe layer containing a minature of
  a) 95 to 60% by weight of a linear, crystalline polyester and
  b) 5 to 40% by weight of a polymer containing reactive groups other than epoxide groups, wherein the polyamide of said inner and outer layers has end groups and wherein at least 50% of all of said end groups are amino end groups, wherein said reactive groups are contained in a concentration of from 4 to 95 mmol/kg based on the total amount of said intermediate layer and said reactive groups react with said amino end groups to bond said inner and outer layers to said intermediate layer; and
  transporting the chemical agent through an opening formed in said pipe by said inner layer.

25. A method according to claim 24, wherein said chemical agent is selected from the group consisting of automotive brake fluid, automotive cooling fluid, hydraulic fluid and fuel.

* * * * *